United States Patent
Tanaka et al.

(10) Patent No.: US 10,436,170 B2
(45) Date of Patent: Oct. 8, 2019

(54) INTERNAL COMBUSTION ENGINE CONTROL DEVICE AND INTERNAL COMBUSTION ENGINE CONTROL METHOD

(71) Applicant: NISSAN MOTOR CO., LTD., Yokohama-shi, Kanagawa (JP)

(72) Inventors: Daisuke Tanaka, Kanagawa (JP); Ryo Uchida, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/578,352

(22) PCT Filed: Jun. 3, 2015

(86) PCT No.: PCT/JP2015/066086
§ 371 (c)(1),
(2) Date: Nov. 30, 2017

(87) PCT Pub. No.: WO2016/194184
PCT Pub. Date: Dec. 8, 2016

(65) Prior Publication Data
US 2018/0163687 A1 Jun. 14, 2018

(51) Int. Cl.
*F02P 5/04* (2006.01)
*F02D 41/14* (2006.01)
(Continued)

(52) U.S. Cl.
CPC ............. *F02P 5/045* (2013.01); *F02D 37/02* (2013.01); *F02D 41/025* (2013.01);
(Continued)

(58) Field of Classification Search
CPC .... F02P 5/045; F02D 41/1454; F02D 41/402; F02D 2041/389; F02D 41/401;
(Continued)

(56) References Cited

U.S. PATENT DOCUMENTS 5,207,058 A 5/1993 Sasaki et al.
5,482,017 A * 1/1996 Brehob ..................... F01N 3/20
123/299
(Continued)

FOREIGN PATENT DOCUMENTS

EP 1643107 A1 * 4/2006 ............. F02D 37/02
EP 1647690 A1 4/2006
(Continued)

OTHER PUBLICATIONS

JP 2007303428—English Translation.*

*Primary Examiner* — Joseph J Dallo
*Assistant Examiner* — Scott A Reinbold
(74) *Attorney, Agent, or Firm* — Drinker Biddle & Reath LLP

(57) ABSTRACT

An internal combustion engine control device controls an in-cylinder direct injection type spark ignition internal combustion engine including a fuel injection valve for injecting fuel into a cylinder and an ignition plug for igniting an air-fuel mixture in the cylinder and configured to inject the fuel in an expansion stroke and ignite the fuel after injection in the expansion stroke under a specific operating condition. The internal combustion engine control device shortens an interval between a fuel injection timing in the expansion stroke and an ignition timing as the ignition timing is retarded.

2 Claims, 13 Drawing Sheets

(51) Int. Cl.
*F02D 41/40* (2006.01)
*F02D 41/02* (2006.01)
*F02D 41/06* (2006.01)
*F02D 41/30* (2006.01)
*F02D 37/02* (2006.01)
*F02D 41/38* (2006.01)

(52) U.S. Cl.
CPC ....... *F02D 41/0255* (2013.01); *F02D 41/064* (2013.01); *F02D 41/1454* (2013.01); *F02D 41/3023* (2013.01); *F02D 41/401* (2013.01); *F02D 41/402* (2013.01); F02D 2041/389 (2013.01); *Y02T 10/26* (2013.01); *Y02T 10/44* (2013.01)

(58) Field of Classification Search
CPC .. F02D 37/02; F02D 41/3064; F02D 41/0035; Y02T 10/44; Y02T 10/123; Y02T 10/46; F02B 23/101; F02B 17/005; F02N 2200/026
USPC .......................................................... 123/299
See application file for complete search history.

(56) References Cited

U.S. PATENT DOCUMENTS

| | | | | |
|---|---|---|---|---|
| 5,483,017 | A | * | 1/1996 | Keller ................... C04B 35/571 501/92 |
| 6,073,606 | A | * | 6/2000 | Shimizu .............. F02D 41/3064 123/295 |
| 2005/0161020 | A1 | * | 7/2005 | Tomita .................... F02D 37/02 123/305 |
| 2008/0022958 | A1 | * | 1/2008 | I ......................... F02D 41/0002 123/179.3 |
| 2016/0153390 | A1 | * | 6/2016 | Ranga .................. F02D 41/402 701/104 |

FOREIGN PATENT DOCUMENTS

| | | | | |
|---|---|---|---|---|
| JP | H04-183922 | A | | 6/1992 |
| JP | H10-212995 | A | | 8/1998 |
| JP | H11-280532 | A | | 10/1999 |
| JP | 2006-52687 | A | | 2/2006 |
| JP | 2006-177179 | A | | 7/2006 |
| JP | 2007303428 | A | * | 11/2007 |
| JP | 2010138819 | A | | 6/2010 |

* cited by examiner

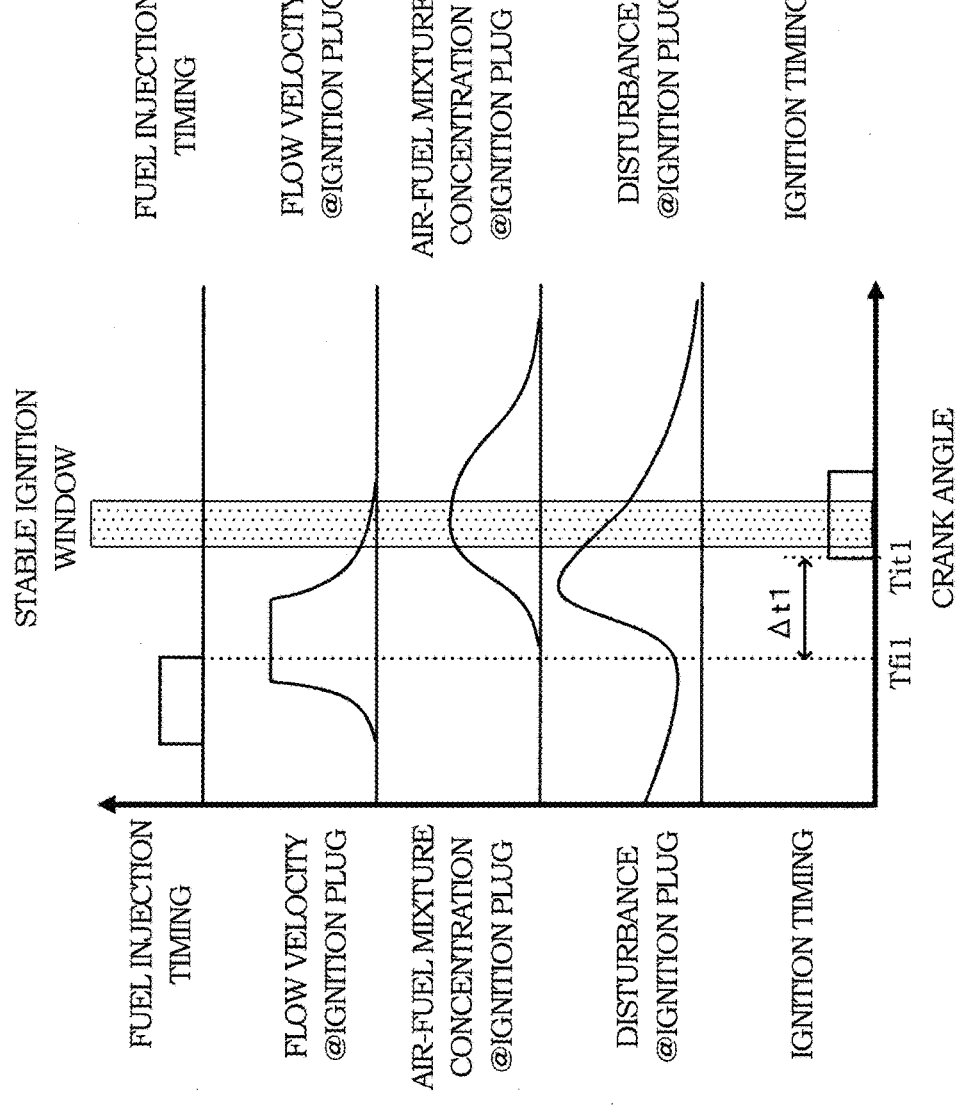
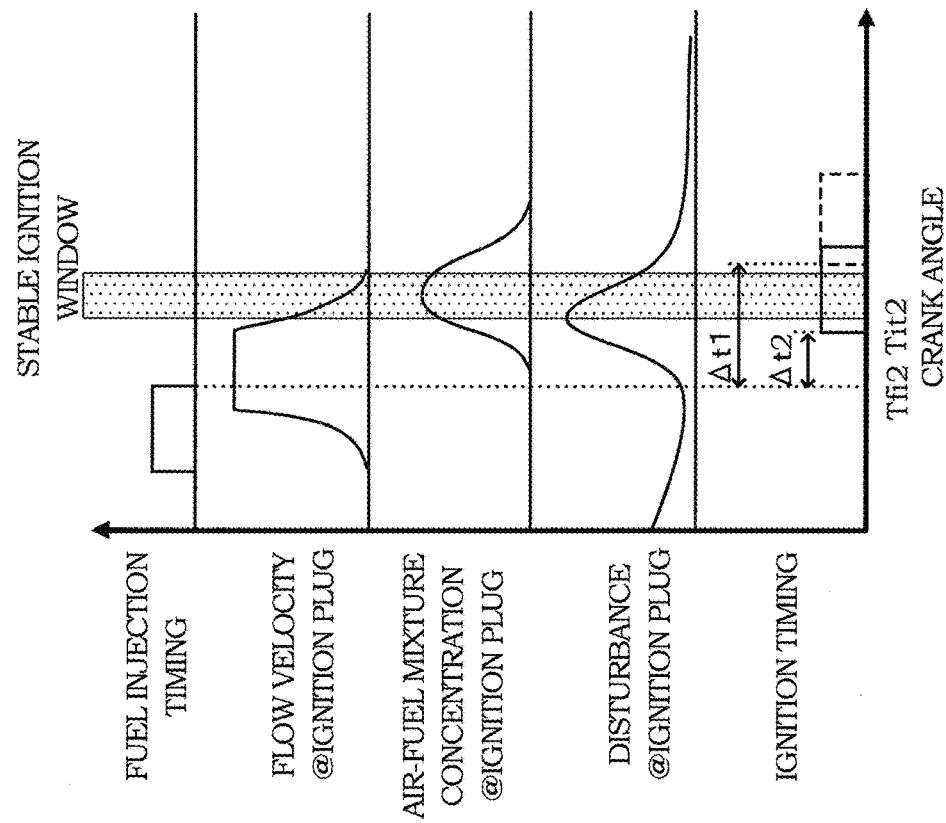
FIG.8A
FIG.8B

INTERNAL COMBUSTION ENGINE CONTROL DEVICE AND INTERNAL COMBUSTION ENGINE CONTROL METHOD

TECHNICAL FIELD

The present invention relates to a control of an in-cylinder injection type spark ignition internal combustion engine (hereinafter, also merely referred to as an "engine") for directly injecting fuel into a cylinder.

BACKGROUND ART

For an in-cylinder direct injection engine, a technique is known which increases an exhaust temperature by injecting fuel in an expansion stroke in order to activate an exhaust gas purifying catalyst early in a warm-up process from a cold start.

In a situation where an exhaust gas purifying catalyst needs to be activated early, the exhaust gas purifying catalyst cannot exhibit a sufficient purifying function. Thus, it is also necessary to reduce the amount of emissions such as HC and NOx from an engine. Particularly, since fuel having collided with a cylinder wall surface and a piston crown surface (hereinafter, also referred to as wall surfaces and the like) are likely to directly adhere to the wall surfaces and the like and be liquefied in a warm-up process from a cold start, the amount of unburned HC emissions tends to increase.

Accordingly, a technique for performing spark ignition before the tip of fuel spray reaches the wall surfaces and the like by injecting fuel in an expansion stroke in order to combine early activation of the exhaust gas purifying catalyst and a reduction of emission components such as HC is disclosed in JP2006-52687A.

SUMMARY OF INVENTION

In an expansion stroke, until spark ignition is performed, an in-cylinder pressure decreases as a piston descends. Thus, a reaching distance of fuel spray is long and the fuel easily vaporizes as compared to the case where the fuel is injected during a compression stroke. In other words, the fuel spray is more easily dispersed during the expansion stroke than during the compression stroke. Thus, if the fuel is injected in the expansion stroke in a configuration in which a fuel injection valve is provided adjacent to an ignition plug in a central part of a combustion chamber ceiling surface as in the above document, the amount of an air-fuel mixture around the ignition plug is insufficient at an ignition timing, which possibly leads to an accidental fire. Specifically, the technique described in the above document has room for improvement in terms of combustion stability.

Accordingly, the present invention aims to provide a control device and a control method capable of realizing early activation of an exhaust gas purifying catalyst while ensuring combustion stability.

According to one embodiment of this invention, an internal combustion engine control device for controlling an in-cylinder direct injection type spark ignition internal combustion engine including a fuel injection valve for injecting fuel into a cylinder and an ignition plug for igniting an air-fuel mixture in the cylinder and configured to inject the fuel in an expansion stroke and ignite the fuel after injection in the expansion stroke under a specific operating condition is provided. The internal combustion engine control device shortens an interval between the fuel injection timing in the expansion stroke and an ignition timing as the ignition timing is retarded.

BRIEF DESCRIPTION OF DRAWINGS

FIG. 8A is a chart showing an example of a relationship of the fuel injection timing, each factor in a cylinder and the ignition timing.

FIG. 8B is a chart showing another example of the relationship of the fuel injection timing, each factor in the cylinder and the ignition timing.

DESCRIPTION OF EMBODIMENT

Hereinafter, embodiments of the present invention are described with reference to the accompanying drawings.

First Embodiment

Figure 1:
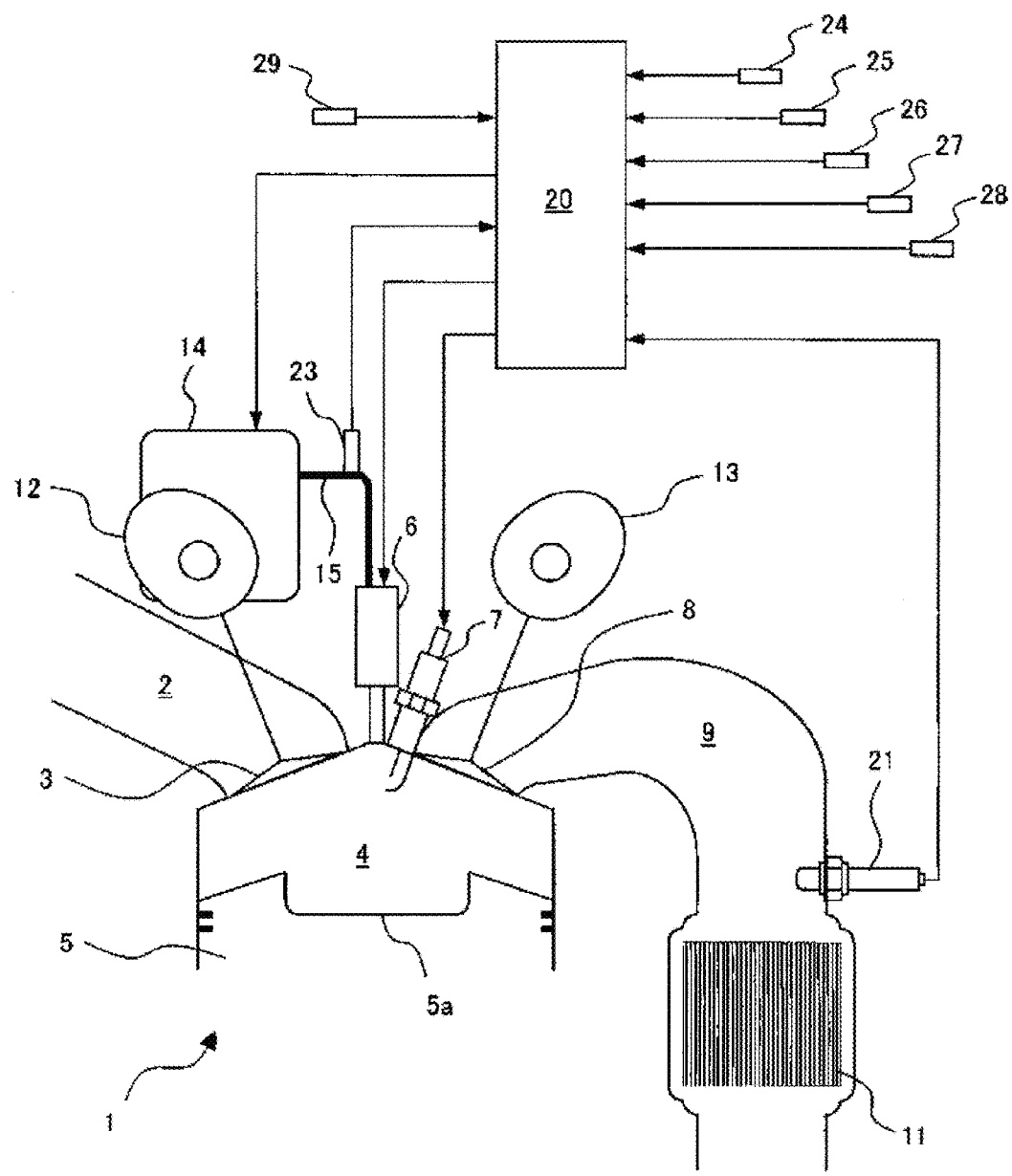
FIG. 1 is a configuration diagram of an internal combustion engine to which a control of an embodiment is applied.

FIG. 1 is a schematic configuration diagram of an in-cylinder direct fuel injection type spark ignition engine (hereinafter, also referred to as an "engine") to which the present embodiment is applied.

The engine 1 introduces fresh air into a combustion chamber 4 via an intake passage 2 and an intake valve 3. A piston 5 configured to perform reciprocating motions is provided in a lower part of the combustion chamber 4. A cavity 5a is formed in a central part of the crown surface of the piston 5.

Figure 2:
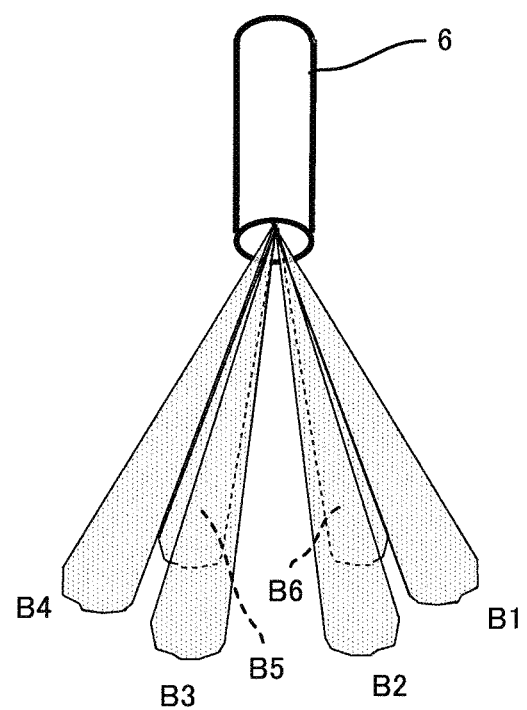
FIG. 2 is a diagram showing an example of spray beams of a fuel injection valve.

A fuel injection valve 6 for directly injecting fuel into the combustion chamber 4 and an ignition plug 7 for spark-igniting an air-fuel mixture in the combustion chamber 4 are provided in an upper part of the combustion chamber 4. The fuel injection valve 6 is a hole nozzle injection valve having a small spray shape change also when an in-cylinder pressure increases in the latter half of a compression stroke and having a high directivity. The fuel injection valve 6 used in the present embodiment is configured such that six spray beams (B1 to B6) form a conical shape with the fuel injection valve 6 serving as a vertex as shown in FIG. 2, but the number of the beams and the like are not limited to these.

Figure 3:
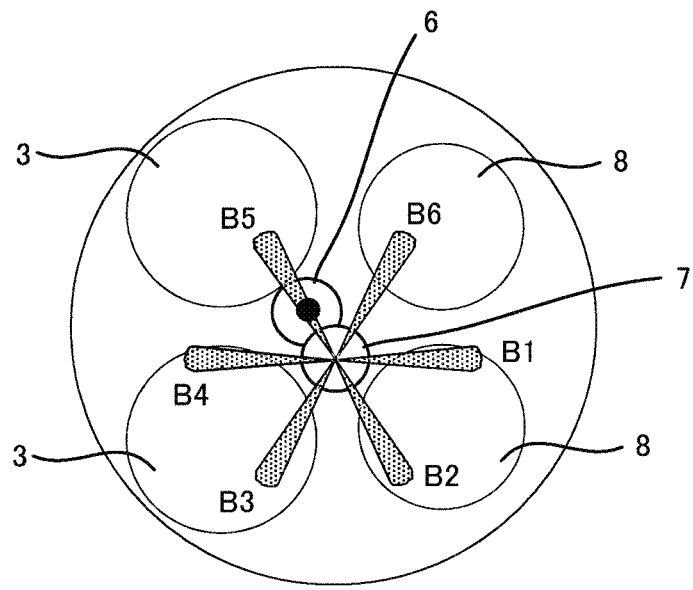
FIG. 3 is a diagram showing an example of a positional relationship between the fuel injection valve and an ignition plug.
Figure 4:
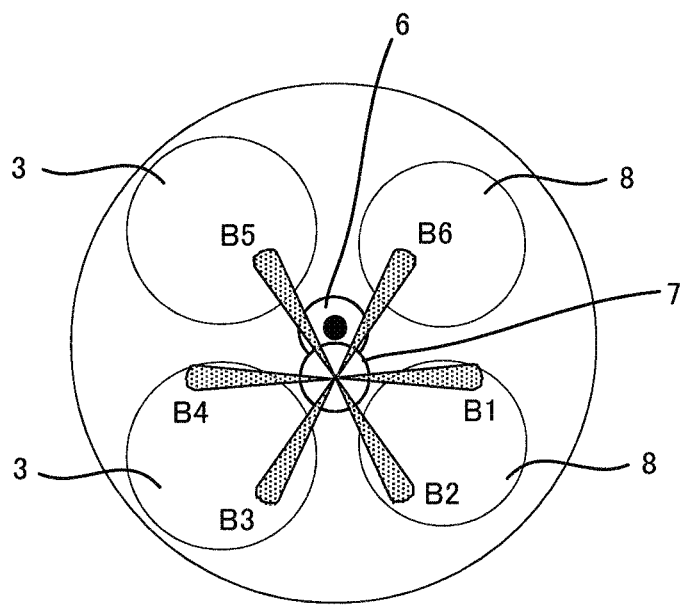
FIG. 4 is a diagram showing another example of the positional relationship between the fuel injection valve and the ignition plug.

FIGS. 3 and 4 are diagrams showing a positional relationship between the fuel injection valve 6 and the ignition plug 7, and show a state when the ceiling surface of the combustion chamber 4 is viewed from the side of the piston 5.

The fuel injection valve 6 and the ignition plug 7 are both arranged adjacent to each other near a center of the ceiling surface of the combustion chamber 4. Specifically, the fuel injection valve 6 and the ignition plug 7 only have to be arranged such that a gas flow can be generated around the ignition plug 7 by fuel injection. For example, as shown in FIG. 3, some (B5 in FIG. 3) of the spray beams may pass through a spark gap of the ignition plug 7. Further, as shown in FIG. 4, some (B5 or B6 in FIG. 4) of the spray beams may be arranged to pass near the spark gap of the ignition plug 7.

Exhaust gas after the end of combustion is discharged into an exhaust passage 9 from the combustion chamber 4 via an exhaust valve 8. An exhaust air-fuel ratio sensor 21 for detecting an exhaust air-fuel ratio is provided in the exhaust passage 9 and an exhaust gas purifying catalyst 11 is provided downstream of the sensor 21.

The intake valve 3 and the exhaust valve 8 are respectively driven by an intake cam 12 provided on an intake cam shaft and an exhaust cam 13 provided on an exhaust cam shaft. A fuel pump 14 is disposed on an end part of the intake cam shaft, and fuel pressurized in this fuel pump 14 is introduced to the fuel injection valve 6 through a high-pressure fuel pipe 15. It should be noted that a fuel pressure sensor 23 for detecting a pressure of the fuel passing along the high-pressure fuel pipe 15 is provided in the high-pressure fuel pipe 15.

The engine 1 is integrally controlled by an engine control unit (ECU) 20. Thus, signals are input to the ECU 20 from an air flow meter 24 for detecting an intake air amount, an accelerator position sensor 25 for detecting an accelerator pedal depression amount, a crank angle sensor 26, a cam angle sensor 27, a cooling water temperature sensor 28, a starter switch 29 and the like besides the exhaust air-fuel ratio sensor 21 and the fuel pressure sensor 23. The ECU 20 controls the fuel injection valve 6, the ignition plug 7, the fuel pump 14 and the like on the basis of these signals.

Figure 5:
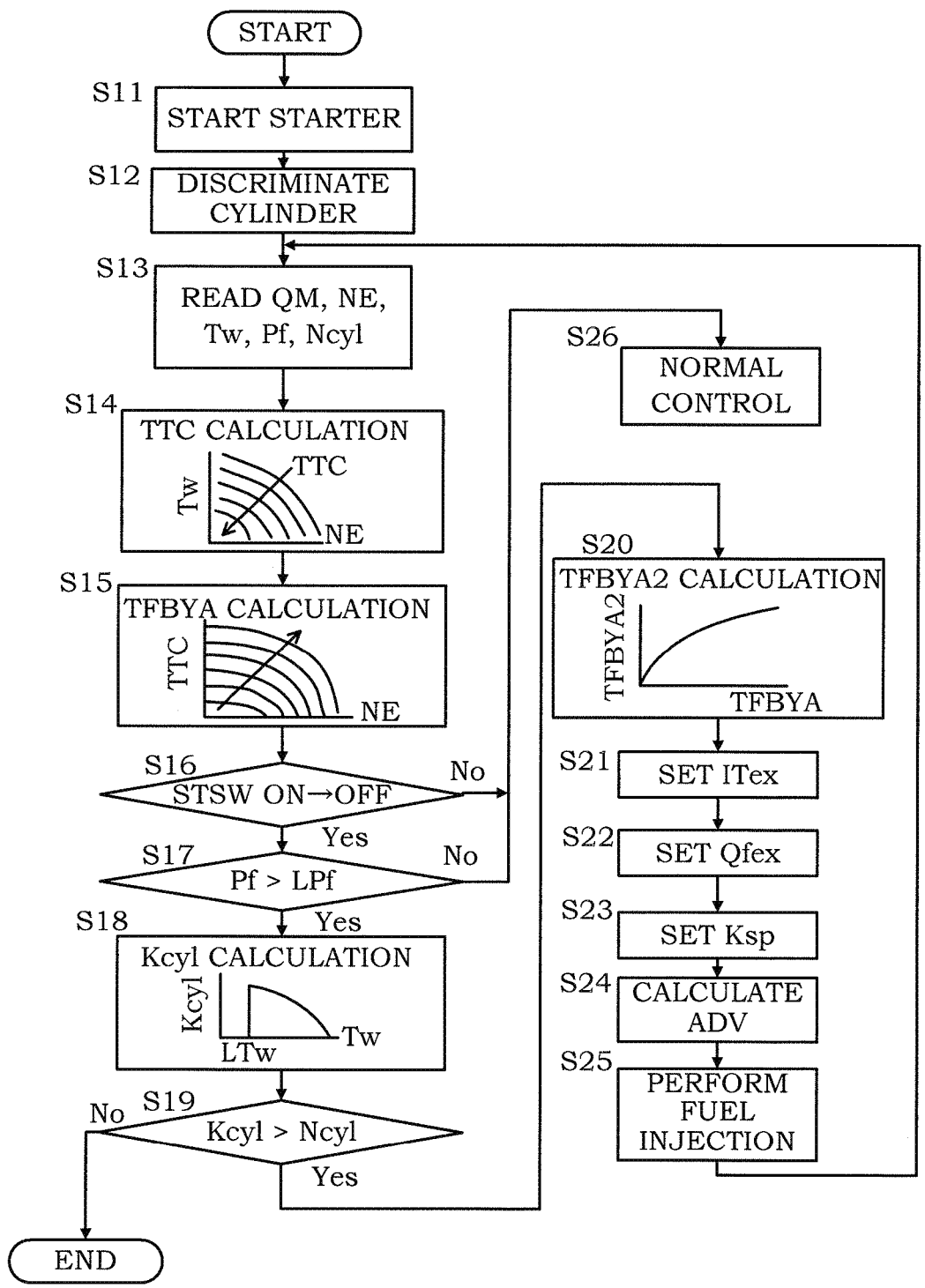
FIG. 5 is a flow chart showing a reference example of a control routine for a fuel injection amount, an injection timing and an ignition timing.

FIG. 5 is a flow chart showing a reference example of a control routine for a fuel injection amount, an injection timing and an ignition timing of the engine 1 described above.

When a driver performs an engine starting operation to turn on the starter switch, the ECU 20 starts a starter in Step S11. In this way, the engine 1 starts cranking.

In Step S12, the ECU 20 discriminates a cylinder on the basis of detection values of the crank angle sensor 26 and the cam angle sensor 27.

In Step S13, the ECU 20 reads an intake air amount QM, an engine revolution speed NE, a fuel pressure Pf, a cooling water temperature Tw and a cycle number Ncyl of each cylinder from initial combustion. It should be noted that the cycle number Ncyl of each cylinder can be judged from the number of injections of the fuel injection valve 6, the number of ignitions of the ignition plug 7 or the like.

In Step S14, the ECU 20 calculates a target torque TTC according to the cooling water temperature Tw and the engine revolution speed NE. For example, table data in which the target torque TTC is assigned to the cooling water temperature Tw and the engine revolution speed NE as shown is stored in the ECU 20 in advance, and the target torque TTC is obtained by referring to this table data.

In Step S15, the ECU 20 calculates a target air-fuel ratio TFBYA from the target torque TTC and the engine revolution speed NE. Map data as shown in which the target air-fuel ratio TFBYA is assigned to the engine revolution speed NE and the target torque TTC is, for example, stored in the ECU 20 and the target air-fuel ratio TFBYA is calculated by referring to this map data. It should be noted that the target air-fuel ratio TFBYA means an inverse of a target excess air ratio X.

In Step S16, the ECU 20 determines whether or not the starter switch (STSW) has been switched from ON to OFF. A processing of Step S17 is performed if the starter switch has been switched from ON to OFF, whereas a processing of Step S26 is performed if the starter switch is kept ON.

In Step S17, the ECU 20 determines whether or not the fuel pressure Pf is higher than a predetermined fuel pressure LPf. It should be noted that the predetermined fuel pressure value LPf used here is set as a fuel pressure value at which the shape of fuel spray injected from the fuel injection valve 6 is deformed, part of the fuel spray does not directly reach the ignition plug 7 and there is a possibility of an accidental fire, and a value determined by checking a relationship between the fuel pressure and spray as a characteristic of the fuel injection valve 6 by an experiment or the like in advance. A processing of Step S18 is performed if Pf>LPf, whereas a processing of Step S26 is performed if Pf≤LPf.

In Step S18, the ECU 20 calculates a catalyst temperature increase control cycle number Kcyl. The catalyst temperature increase control cycle number Kcyl is a cycle number needed to be reached until the exhaust gas purifying catalyst 11 reaches an activation temperature TcatH, i.e. a cycle number necessary for a temperature increase control. Here, a relationship between a starting-time water temperature Tw0 and the catalyst temperature increase control cycle number Kcyl is obtained by an experiment or the like and stored as table data in the ECU 20 in advance, and a catalyst temperature Tcat is calculated by referring to this table data without being directly measured. Here, Kcyl=0 is set in this routine if the starting-time water temperature Tw0 is below a predetermined temperature LTw. That is, a catalyst temperature increase control is not executed. It should be noted that the predetermined temperature LTw is set as a temperature at which it is judged that stratified combustion cannot be carried out due to a combustion stability problem.

In Step S19, the ECU 20 determines whether or not the present cycle number Ncyl is below the catalyst temperature increase control cycle number Kcyl (Kcyl>Ncyl). If Kcyl>Ncyl, a processing of Step S20 is performed, assuming the presence of a catalyst temperature increase request and the catalyst temperature increase control is executed as described below (Steps S20 to S24). On the other hand, if Kcyl≤Ncyl, this routine is ended.

In Step S20, the ECU 20 calculates a corrected air-fuel ratio TFBYA2. This corrected air-fuel ratio TFBYA2 is the sum of the target air-fuel ratio TFBYA required to generate the target torque TTC and the amount of unburned components for carrying out "after-burning". Here, to efficiently increase the exhaust gas temperature, the amount of CO and $H_2$, which are incomplete combustion products generated by main combustion, and the amount of residual oxygen present after main combustion need to be balanced. Thus, the corrected air-fuel ratio TFBYA2 is set between 0.8 and 1.0.

In Step S21, the ECU 20 sets an optimal injection start timing ITex (an early phase to a middle phase of an expansion stroke) in the expansion stroke from the engine revolution speed NE and the target torque TTC to carry out stratified combustion by expansion stroke injection for injecting the fuel in the expansion stroke. For example, the injection start timing ITex is set by referring to map data in which the injection start timing ITex is assigned to the engine revolution speed NE and the target torque TTC. The map data of the injection start timing ITex used here is a relationship of the engine revolution speed NE and an engine load with the optimal injection start timing ITex obtained by an experiment or the like and stored in the ECU 20 in advance.

In Step S22, the ECU 20 sets a corrected fuel injection amount Qfex by multiplying a basic fuel injection amount (K×QM/NE; K is a constant) by the corrected target air-fuel ratio TFBYA2 and a combustion efficiency coefficient Kco. The basic fuel injection amount is a fuel injection amount equivalent to a stoichiometric air-fuel ratio determined from the intake air amount QM and the engine revolution speed NE. The combustion efficiency coefficient Kco is multiplied here because of a necessity to consider the combustion efficiency of the fuel since part of supplied fuel is used for "after-burning" in the expansion stroke injection and the total amount of the fuel is not converted into a torque. It should be noted that a relationship of the fuel efficiency coefficient Kco with the combustion efficiency and the engine load is, for example, obtained by an experiment or the like and stored in the ECU 20 in advance, and the fuel efficiency coefficient Kco is read by referring to this relationship. Further, a throttle (air amount) is adjusted according to a combustion amount increased in consideration of the combustion efficiency to reach the target air-fuel ratio TFBYA.

It should be noted that, during the stratified combustion by the expansion stroke injection, the air-fuel mixture around the ignition plug 7 at the ignition timing has an ignitable air-fuel ratio richer than a stoichiometric air-fuel ratio. Further, during the stratified combustion by the expansion stroke injection, a total exhaust air-fuel ratio is desirably controlled to be from the stoichiometric air-fuel ratio to a lean air-fuel ratio (exhaust A/F=about 14.4 to 18).

In Step S23, the ECU 20 sets a fuel split ratio Ksp, i.e. a ratio of a prior injection fuel amount for injecting part of the fuel earlier to the total (corrected) fuel amount Qfex. This fuel split ratio Ksp is normally set at a value of about 0 to 0.3 (i.e. 0% to 30%) although an optimal value determined by the engine revolution speed NE and the engine load is present. Here, the fuel split ratio Ksp is set on the basis of an experimental result.

In Step S24, the ECU 20 calculates an ignition timing ADV by the following method.

First, a crank angle conversion value (hereinafter, also merely referred to as an "injection period") TI of an injection period necessary to inject the correct fuel injection amount Qfex at the fuel pressure Pf is obtained. For example, an injection amount (injection rate) dQf per unit time is obtained and this injection period TI is obtained from the corrected fuel injection amount Qfex and the injection rate dQf by Equation (1). It should be noted that an injection rate characteristic in relation to the fuel pressure Pf of the fuel injection valve 6 is obtained by an experiment or the like and stored as table data in the ECU 20 in advance, and the injection rate dQf is obtained by referring to this table data.

$$TI=Qfex/dQf \times 360 \times NE/60 \times C \qquad (1)$$

where C is a constant for unit conversion.

The ignition timing ADV is calculated by Equation (2) using the calculated injection timing TI and the read injection start timing ITex.

$$ADV=ITex+TI-Td \qquad (2)$$

Here, Td is a coefficient for matching the ignition timing ADV so that ignition can be performed near the final end of the spray and before the arrival of the spray tip at the wall surface of the combustion chamber 4. It should be noted that optimal values are obtained by an experience or the like and the data thereof is stored in the ECU 20 in advance, and this coefficient Td can be obtained by referring to this data each time.

In Step S25, the ECU 20 injects the fuel. However, the prior fuel injection amount (=total fuel amount Qfex×fuel split ratio Ksp) of the fuel is injected earlier during an intake stroke and the remaining amount (=Qfex×(1−Ksp)) of the fuel is injected at the injection start timing ITex set between the initial phase and the middle phase of the expansion stroke.

On the other hand, in Step S26 performed if the stator switch is kept ON in Step S16 or if the fuel pressure Pf is equal to or lower than the predetermined fuel pressure value LPf in Step S17, the ECU 20 executes a normal control. The normal control mentioned here is as follows.

First, a case where the starter switch is kept ON is a start transient time accompanied by a sudden rotation increase. In this case, the amount of the fuel calculated from the basic fuel injection amount, the target air-fuel ratio, a water temperature increase amount correction, during-start and after-start increase amount corrections and the like is injected in the intake stroke or in the latter half of the compression stroke. Further, for a good rotation increase, the ignition timing ADV is set relatively more toward an advance side than the ignition timing during normal fast idling.

On the other hand, even after the starter switch is switched from ON to OFF, a possibility of an accidental fire without part of the fuel spray directly reaching the ignition plug 7 is judged, the fuel is injected in the intake stroke or the compression stroke and the ignition timing ADV is, for example, set to MBT (Minimum advance for the Best Torque) in relation to the engine revolution speed and the engine load despite the fuel injection timing if the fuel pressure Pf is equal to or lower than the predetermined fuel pressure value LPf.

Figure 6:
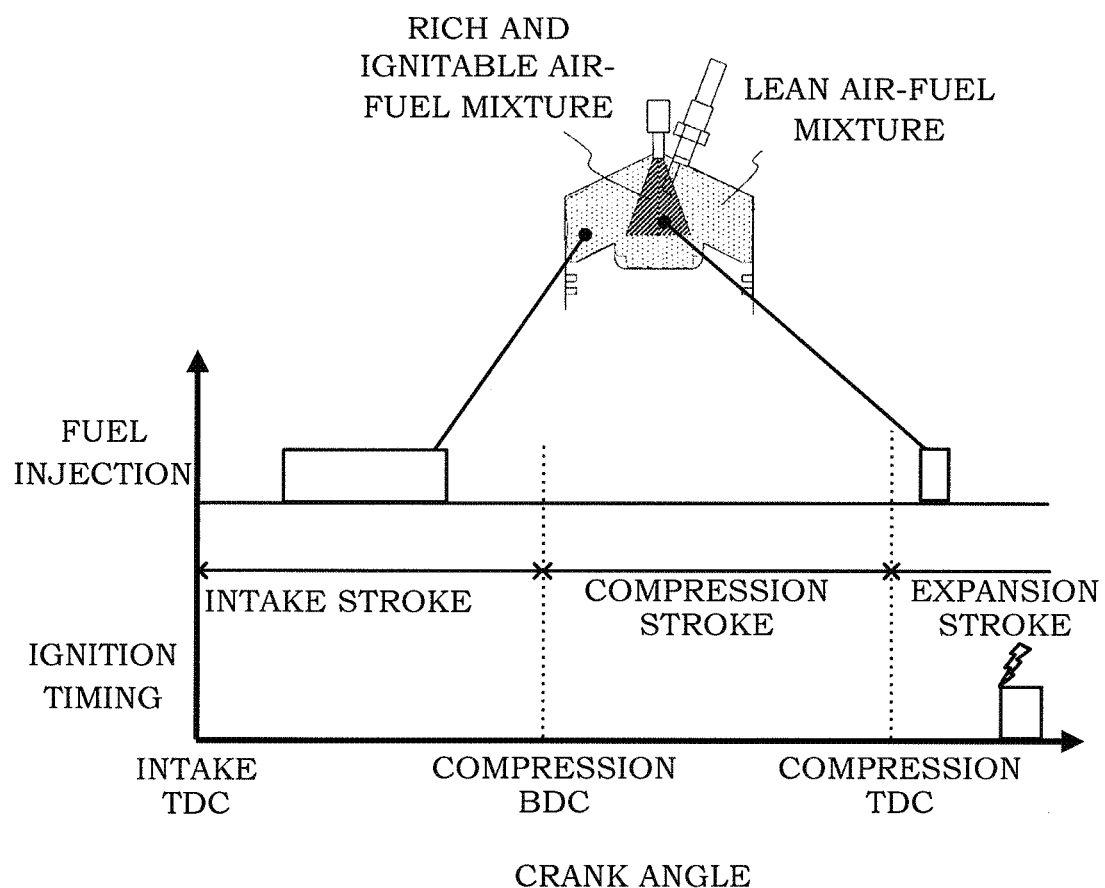
FIG. 6 is a chart showing a state of an air-fuel mixture at the ignition timing.

FIG. 6 is a chart showing a state of the air-fuel mixture at the ignition timing expected when the control routine described above is executed. As shown, it is expected that an air-fuel mixture having an ignitable air-fuel ratio richer than the stoichiometric air-fuel ratio is formed around the ignition plug 7 by the expansion stroke injection at the ignition timing and an air-fuel mixture leaner than a stoichiometric air-fuel mixture is formed outside the former air-fuel mixture by the intake stroke injection. To improve the effect of the catalyst temperature increased by "after-burning", it is desirable to ignite at a later timing so that exhaust gas having a higher temperature is discharged from the engine 1.

The fuel has a general fluid property of more easily vaporizing with a reduction in pressure. In other words, the fuel has a property of being more easily dispersed with a reduction in in-cylinder pressure. During the expansion stroke, the in-cylinder pressure decreases as the piston 5 descends. Specifically, as the ignition timing is retarded to promote the catalyst temperature increase, the fuel injected in the expansion stroke is more easily dispersed and it becomes difficult to cause the ignitable air-fuel mixture richer than the stoichiometric air-fuel mixture as shown in FIG. 6 to be present around the ignition plug 7 at the ignition timing. As a result, a possibility of an accidental fire increases. As just described, the control routine described above has room for improvement in terms of ensuring combustion stability.

Accordingly, in the present embodiment, a control described below is executed to activate the exhaust gas purifying catalyst early while ensuring combustion stability.

First, a way of thinking serving as a basis of the control according to the present embodiment is described.

The fuel injected by the expansion stroke injection is more easily dispersed in the latter half of the expansion stroke as described above. If ignition is performed after an air-fuel mixture concentration around the ignition plug 7 decreases, combustion stability is impaired.

Figure 7:
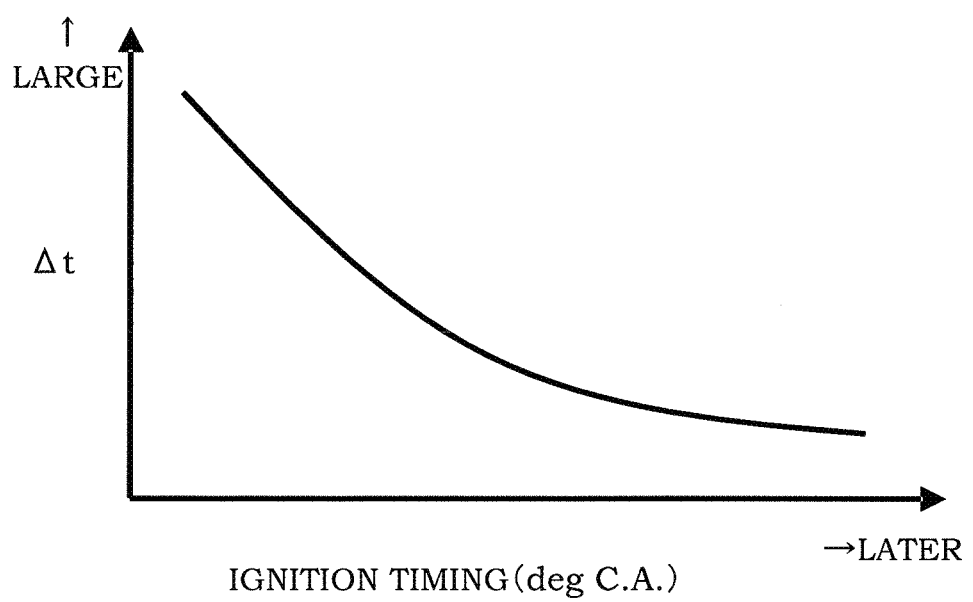
FIG. 7 is a graph showing a relationship between an interval Δt from a fuel injection timing to the ignition timing and the ignition timing.

Accordingly, in the case of performing the expansion stroke injection, an interval (hereinafter, also referred to as an "injection-ignition interval") Δt from a fuel injection end timing to the ignition timing is shortened so that ignition is performed before the air-fuel mixture concentration around the ignition plug 7 decreases. Further, since the in-cylinder pressure decreases as the position of the piston 5 is lowered and the fuel spray is easily dispersed during the expansion stroke, ΔT is shortened as the ignition timing is retarded as shown in FIG. 7.

FIGS. 8A and 8B are timing charts showing a relationship between the injection-ignition interval Δt and combustion stability. FIG. 8A is a chart when the fuel is injected at a relatively early timing of the expansion stroke (hereinafter, also referred to a "case of early fuel injection timing"). FIG. 8B is a chart when the fuel is injected in the middle phase of the expansion stroke (hereinafter, also referred to as a "case of retarded fuel injection timing"). A "stable ignition window" in FIGS. 8A and 8B means a range of the ignition timing at which good combustion is obtained. That is, a period during which the air-fuel mixture concentration around the ignition plug 7 is substantially peaked is the stable ignition window. The ignition timing is set to include this stable ignition window.

It should be noted that although the comparison of FIGS. 8A and 8B shows that the fuel injection timing is substantially at the same position, this is because a variation of each factor in the cylinder and the ignition timing are shown on the basis of the fuel injection timing to compare the magnitude of Δt, and an actual fuel injection timing is more on the advance side in FIG. 8A than in FIG. 8B. The same applies also for the ignition timing and an ignition timing Tit1 in FIG. 8A is more on the advance side than an ignition timing Tit2 in FIG. 8B.

A flow velocity of gas around the ignition plug 7 increases with the start of the fuel injection in both FIGS. 8A and 8B and decreases after the end of the fuel injection. However, a maximum value of the flow velocity is larger and a period until the maximum value is reached and a period until the flow velocity decreases from the maximum value are shorter in FIG. 8B. This is because the fuel is injected in a state where the in-cylinder pressure is low as the fuel injection timing is retarded and the gas more easily flows with a decrease in in-cylinder pressure.

This difference of gas fluidity also affects the air-fuel mixture concentration around the ignition plug 7 and a disturbance of the gas flow. The air-fuel mixture concentration around the ignition plug 7 and the disturbance of the gas flow more moderately increases and more moderately decreases when the fuel injection timing is early (FIG. 8A) than when the fuel injection timing is later (FIG. 8B). Thus, an interval between the fuel injection end timing and the stable ignition window is longer when the fuel injection timing is early than when the fuel injection timing is later.

As a result, if the ignition timing is set using an injection-ignition interval Δt1 for the case where the fuel injection timing is early when the fuel injection timing is later, the ignition timing is deviated from the stable ignition window as shown by broken line in FIG. 8B. To ensure combustion stability when the fuel injection timing is relatively later, the injection-ignition interval needs to be shortened to Δt2 as shown in FIG. 8B. This matches the relationship between the injection-ignition interval Δt and the ignition timing described with reference to FIG. 7. It should be noted that although a time given to form the air-fuel mixture becomes shorter as the injection-ignition interval Δt becomes shorter, there is no generation of smoke since pressures of fuel pumps have been increased and fuel spray has been atomized in recent years.

Next, specific contents of the control according to the present embodiment are described.

Figure 9:
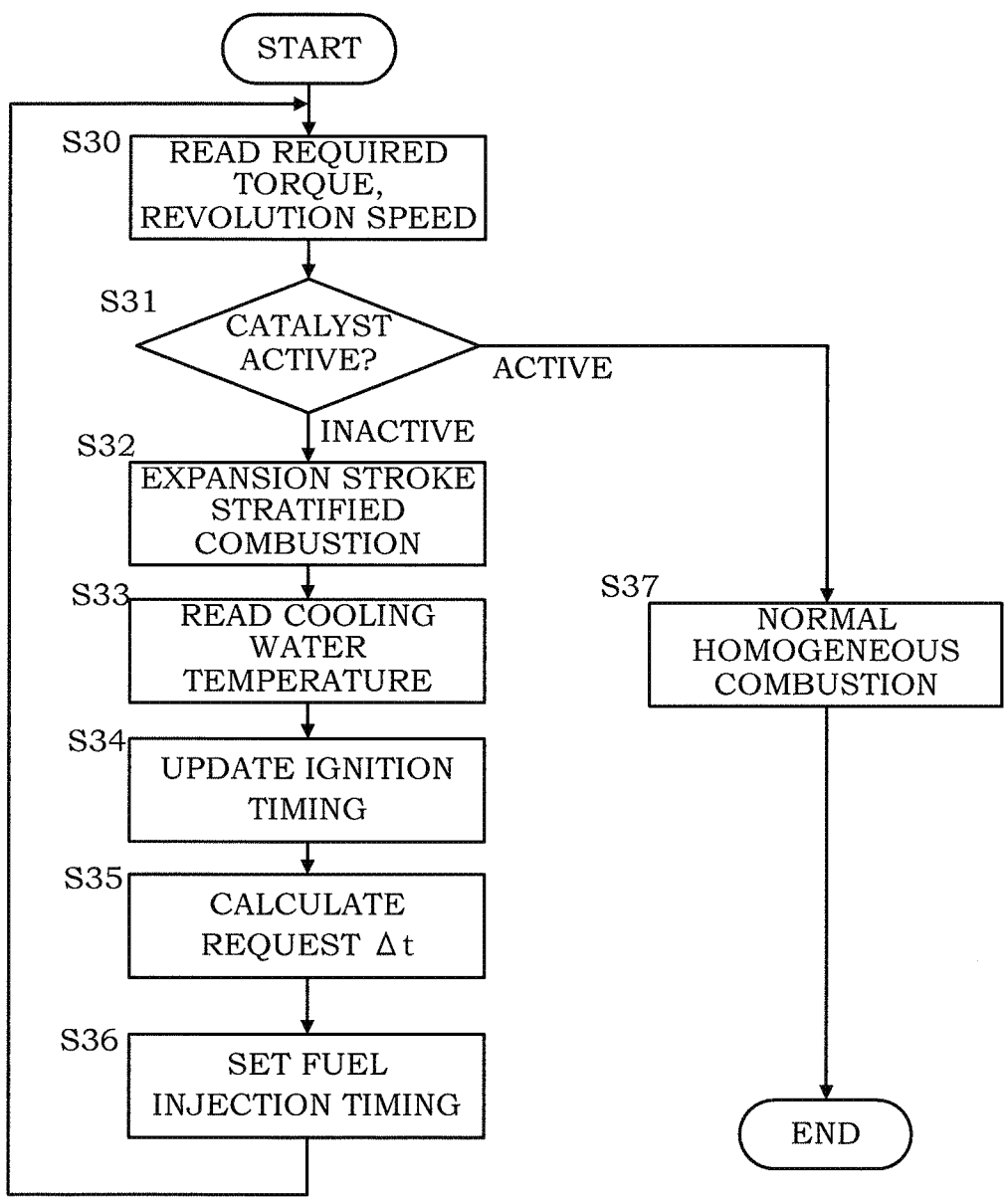
FIG. 9 is a flow chart showing a control routine according to a first embodiment.

FIG. 9 is a flow chart showing a control routine according to the present embodiment. As described above, the control routine of FIG. 5 has room for improvement in the fuel injection timing and the ignition timing during the catalyst temperature increase control (Steps S20 to S24). Accordingly, in present embodiment, the fuel injection timing and the ignition timing are controlled by the control routine of FIG. 9 instead of S20 to S24 of FIG. 5.

In Step S30, the ECU 20 reads the target torque TTC and the engine revolution speed NE.

In Step S31, the ECU 20 determines whether or not the exhaust gas purifying catalyst 11 is in an active state and determines to carry out normal homogeneous combustion in Step S37 if the exhaust gas purifying catalyst 11 is in the active state. The normal homogeneous combustion mentioned here is a combustion mode for forming a homogeneous stoichiometric air-fuel mixture in the entire cylinder by the intake stroke injection and performing ignition during the compression stroke.

If the exhaust gas purifying catalyst 11 is determined to be in an inactive state in Step S31, the ECU 20 performs a processing of Step S32.

In Step S32, the ECU 20 determines to carry out a combustion mode (expansion stroke stratified combustion) for forming a stratified air-fuel mixture by the expansion stroke injection.

In Step S33, the ECU 20 reads the cooling water temperature Tw. It should be noted that what is read here only has to be a temperature correlated with an in-cylinder temperature. For example, an oil temperature may be read.

In Step S34, the ECU 20 updates the ignition timing. For example, a reference ignition timing for expansion stroke stratified combustion set in advance with a margin with respect to a combustion stability limit is shifted toward the retard side. Since combustion stability decreases as the in-cylinder temperature decreases, how much the combustion stability limit is shifted is determined according to the cooling water temperature. It should be noted that the reference ignition timing may be set by a control routine different from this control routine, e.g. by Steps S20 to S24 of FIG. 5.

Figure 10:
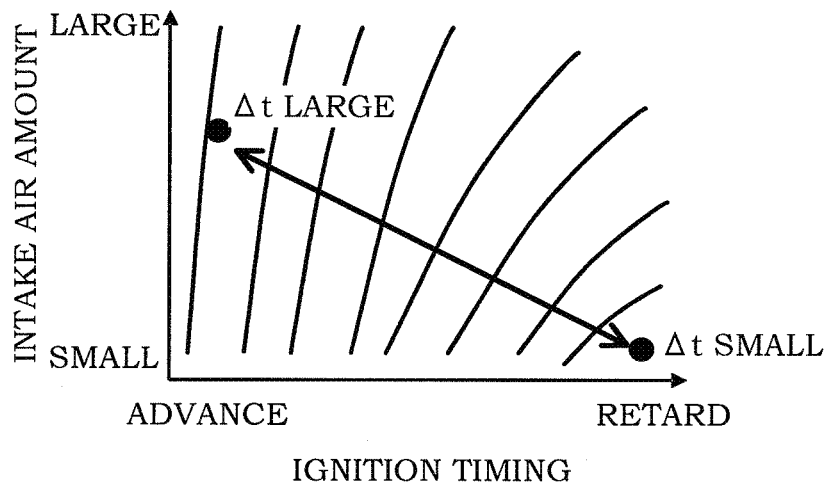
FIG. 10 is a request Δt map.

In Step S35, the ECU 20 calculates a request Δt. The request Δt means the injection-ignition interval at which combustion stability can be ensured in the expansion stroke stratified combustion. Map data in which the request Δ is assigned to the intake air amount and the ignition timing as shown in FIG. 10 is, for example, stored in the ECU 20 and the request Δt is calculated by referring to this map data. In FIG. 10, as the ignition timing is shifted toward the retard side and the intake air amount decreases, the request Δ becomes shorter. The request Δt become shorter as the ignition timing is shifted toward the retard side because the in-cylinder pressure decreases and the fuel spray is easily dispersed as the ignition timing is retarded as described above. The request Δt becomes longer as the intake air amount increases because the fuel injection amount also increases and a time required for dispersion becomes longer as the intake air amount increases. It should be noted that the intake air amount may be calculated from the target torque and the engine revolution speed or a detection value of the air flow meter 24 may be read in Step S30.

In Step S36, the ECU 20 sets the fuel injection timing by the following method.

Figure 11:
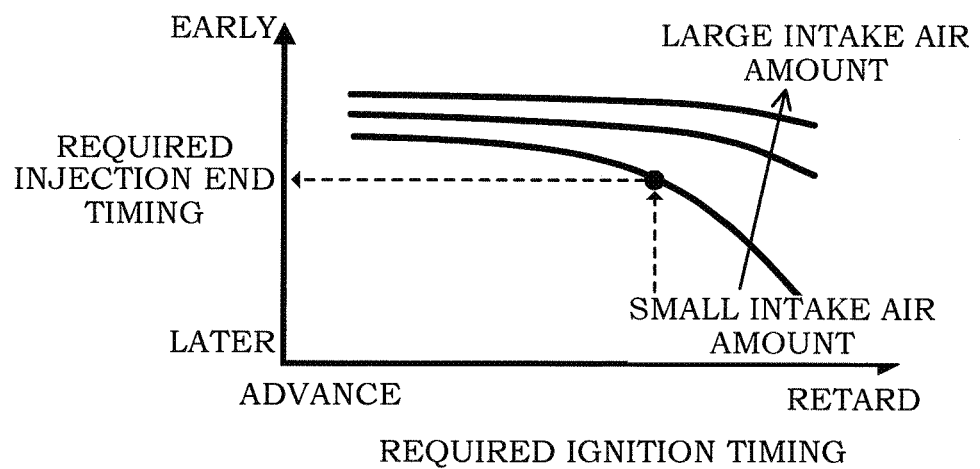
FIG. 11 is map data used for the calculation of a required injection end timing.

First, the end timing of the fuel injection (required injection timing end timing) is calculated from the ignition timing (required ignition timing) updated in Step S34 and the intake air amount. A relationship of the required ignition timing, the required injection end timing and the intake air amount is, for example, obtained by an experiment or the like in and stored as map data as shown in FIG. 11 in the ECU 20 in advance, and the required injection end timing is calculated on the basis of the required ignition timing and the intake air amount.

If the required injection end timing calculated in this way and a fuel injection period obtained from the fuel injection amount are used, a fuel injection start timing is also obtained. It should be noted that the fuel injection amount is set, for example, by a technique similar to that of Steps S22 and S23 of FIG. 5.

Then, the ECU 20 starts fuel injection at the fuel injection start timing calculated as described above.

Figure 12:
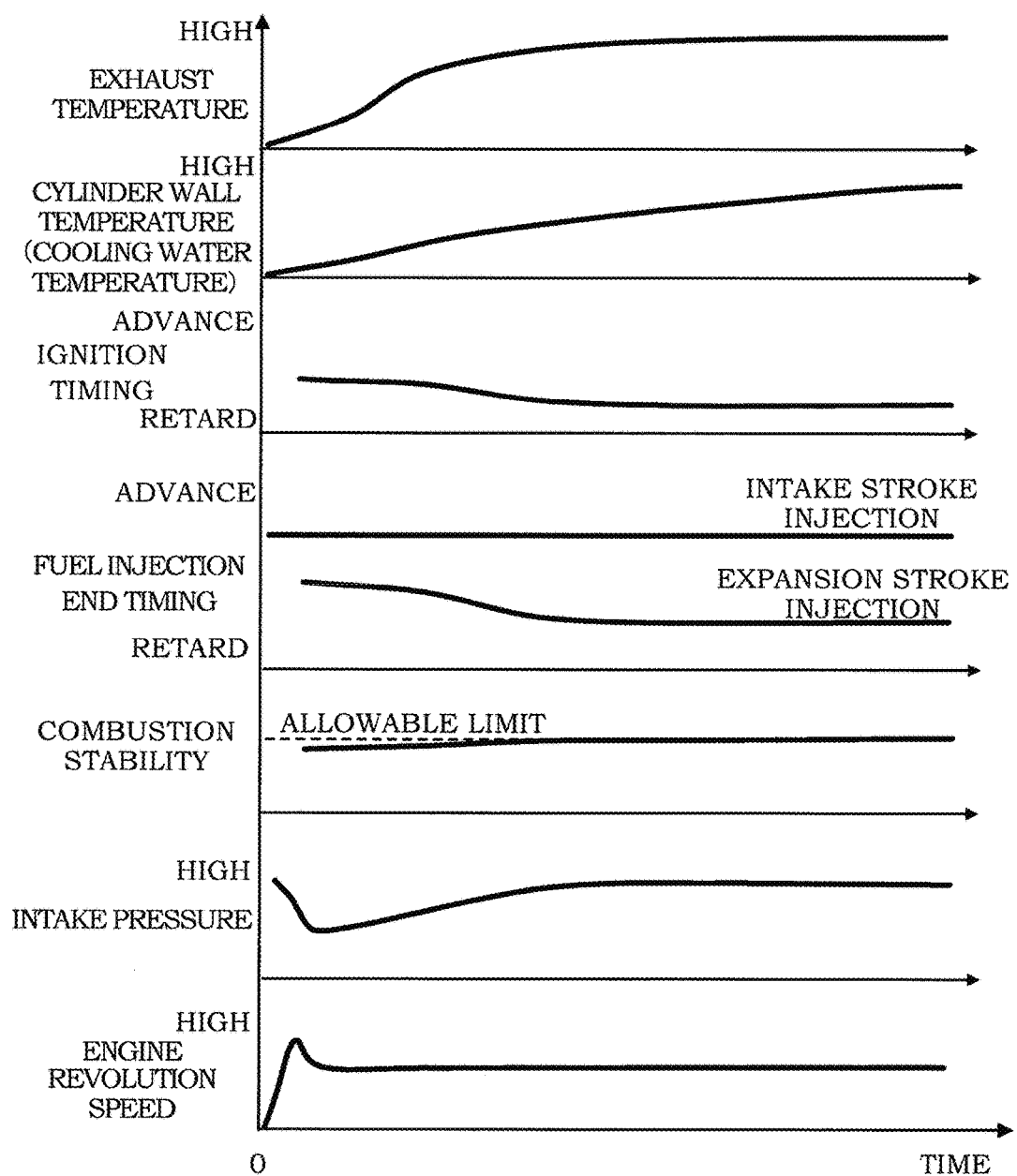
FIG. 12 is a timing chart when a control of the first embodiment is executed.

FIG. 12 is a timing chart when the control of the present embodiment is executed at a cold start of the engine 1. Here, it is assumed that an idling state is maintained after the engine 1 is started at time 0.

Since after the cold start, the expansion stroke stratified combustion is carried out to increase the temperature of the exhaust gas purifying catalyst 11. According to a cylinder wall temperature increase, the ignition timing is gradually shifted toward the retard side and the fuel injection end timing is also shifted toward the retard side according to this. The retardation of the ignition timing causes the ignition timing to approach the combustion stability limit. However, since the fuel injection end timing is set to reach the injection-ignition interval Δt described above, stable stratified combustion can be realized. As a result, combustion stability does not exceed an allowable limit.

As described above, in the present embodiment, the fuel is injected in the expansion stroke and stratified combustion (layer combustion) is carried out by igniting the fuel spray injected in the expansion stroke under an operating condition to promote a temperature increase of the exhaust gas purifying catalyst 11 (specific operating condition). At this time, the ECU 20 makes the interval (Δt) between the fuel injection timing and the ignition timing in the expansion stroke shorter as the ignition timing is retarded.

In this way, ignition can be performed before the fuel spray around the ignition plug 7 is dispersed and combustion stability of the stratified combustion can be ensured. Specifically, it is possible to realize early activation of the exhaust gas purifying catalyst 11 by the stratified combustion while ensuring combustion stability.

Second Embodiment

Next, a second embodiment is described. In the present embodiment, in order to further enhance combustion stability of the expansion stroke stratified combustion, the fuel injection amount in the expansion stroke is increased as the ignition timing is retarded, i.e. as the ignition timing approaches the combustion limit. Combustion stability is enhanced by increasing the fuel injection amount in the expansion stroke for the following reason.

Firstly, this is because the amount of the rich and ignitable air-fuel mixture remaining around the ignition plug 7 at the ignition timing increases as the fuel injection amount in the expansion stroke increases. Secondly, this is because of injection characteristics of the fuel injection valve 6. The injection amount of the fuel injection valve 6 is basically in proportion to an injection drive pulse width (injection time). However, as the injection drive pulse width is made shorter, linearity between the injection drive pulse width and the injection amount is lost in a very short injection drive pulse width region due to performance restrictions of an injection valve body and a control circuit. Thus, as the injection drive pulse width becomes longer, a variation of the fuel injection amount becomes smaller and combustion stability is enhanced.

Figure 13:
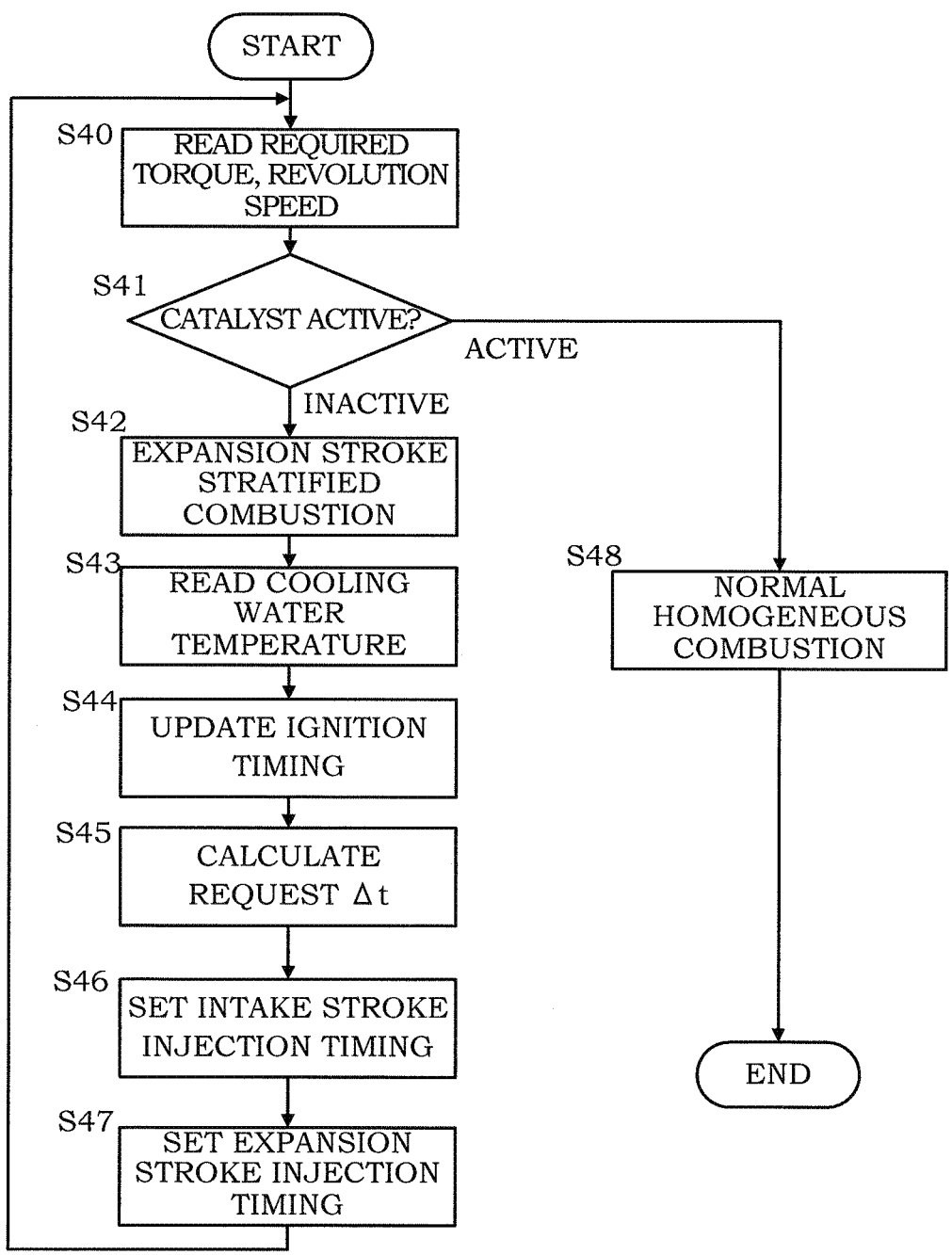
FIG. 13 is a flow chart showing a control routine according to a second embodiment.

FIG. 13 is a flow chart showing a control routine according to the present embodiment.

Steps S40 to S45 and S48 are not described since being the same as Steps S30 to S35 and S37 of FIG. 9.

In Step S46, the ECU 20 sets the injection timing of the intake stroke injection. First, the fuel injection amount by the intake stroke injection is calculated and the fuel injection start timing is set to finish the fuel injection during the intake stroke on the basis of this. The fuel injection amount by the intake stroke injection may be calculated on the basis of the total fuel amount Qfex and the fuel split ratio Ksp, for example, as in Step S23 of FIG. 5.

Figure 14:
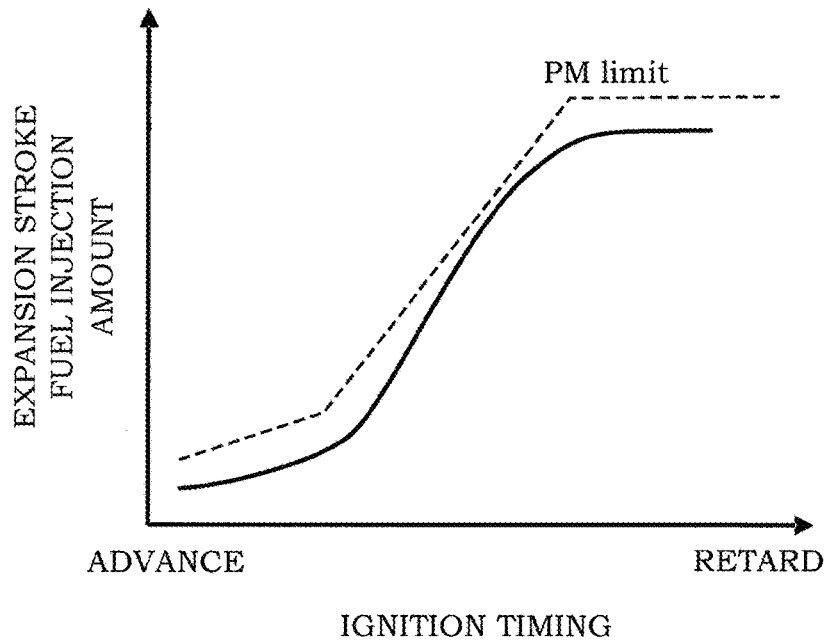
FIG. 14 is a graph showing a relationship between an expansion stroke fuel injection amount and an ignition timing in the second embodiment.

In Step S47, the ECU 20 sets the injection timing of the expansion stroke injection. First, the fuel injection amount by the expansion stroke injection is calculated and the fuel injection timing is set on the basis of this by a technique similar to that of Step S36 of FIG. 9. A relationship between the ignition timing and the fuel injection amount in the expansion stroke as shown in FIG. 14 is, for example, obtained and stored as table data in the ECU 20 in advance, and the fuel injection amount by the expansion stroke injection is calculated by referring to this table data. In FIG. 14, the fuel injection amount by the expansion stroke injection is set not to exceed a fuel injection amount (broken line in FIG. 14) determined from an emission amount regulation value of PM (Particulate Matter).

Figure 15:
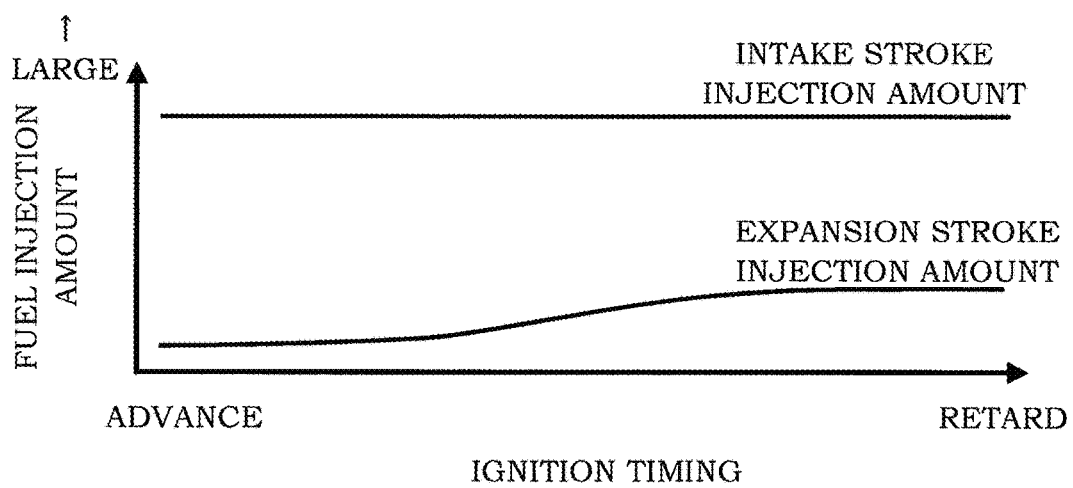
FIG. 15 is a graph showing a relationship between an intake stroke fuel injection amount and the expansion stroke fuel injection amount in the second embodiment.

FIG. 15 summarizes a relationship of the fuel injection amount by the intake stroke injection and the fuel injection amount by the expansion stroke injection with the ignition timing in the present embodiment. As shown, the fuel injection amount by the intake stroke injection is constant regardless of the ignition timing, whereas the fuel injection amount by the expansion stroke injection increases as the ignition timing is shifted toward the retard side as described above.

As described above, in the present embodiment, since the ECU 20 increases the fuel injection amount by the expansion stroke as the ignition timing is retarded, it is possible to suppress a reduction of the air-fuel mixture concentration around the ignition plug 7 at the ignition timing and enhance the stability of the fuel injection amount control. In this way, combustion stability can be improved.

Third Embodiment

Next, a third embodiment is described. In the present embodiment, the control routine of FIG. 13 is basically executed as in the second embodiment, but a method for calculating the fuel injection amount by the intake stroke injection in Step S46 differs. Processing contents other than that of Step S46 are not described since being the same as in the second embodiment.

Figure 16:
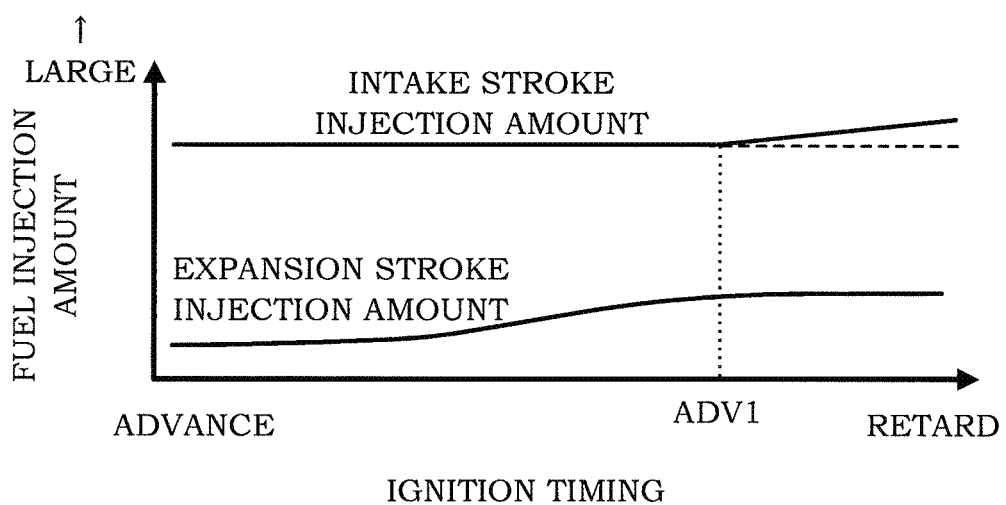
FIG. 16 is a graph showing a relationship between an intake stroke fuel injection amount and an expansion stroke fuel injection amount in a third embodiment.

FIG. 16 summarizes a relationship of the fuel injection amount by the intake stroke injection and the fuel injection amount by the expansion stroke injection with the ignition timing in the present embodiment. As shown, the ECU 20 increases the fuel injection amount in the intake stroke so that the air-fuel ratio of the homogeneous air-fuel mixture formed in the entire cylinder by the fuel injected in the intake stroke is richer than the stoichiometric air-fuel ratio when the ignition timing is later than a predetermined timing (ADV1 in FIG. 16). It should be noted that although the intake stroke injection amount increases as the ignition timing becomes later than the ignition timing ADV1 in FIG. 16, the fuel injection amount may be set at a fixed value larger on a retard side of the ignition timing ADV1 than on an advance side.

The predetermined timing is such an ignition timing that a sufficient combustion speed cannot be obtained and combustion stability cannot be ensured even when the air-fuel mixture around the ignition plug 7 generated by the expansion stroke injection is ignited if the air-fuel ratio of the homogeneous air-fuel mixture generated in the entire cylinder by the intake stroke injection is leaner than the stoichiometric air-fuel ratio. Such a predetermined timing differs depending on the specifications of the engine 1 and is set on the basis of a result of an experiment or the like.

If the air-fuel ratio of the homogeneous air-fuel mixture generated in the entire cylinder by the intake stroke injection is richer than the stoichiometric air-fuel ratio, flame more easily propagates than in the case where this air-fuel ratio is leaner than the stoichiometric air-fuel ratio. Specifically, even if the stratified air-fuel mixture concentration around the ignition plug 7 at the ignition timing is reduced by the retardation of the ignition timing, combustion stability and combustion speed can be ensured.

As described above, in the present embodiment, the fuel injection amount in the intake stroke is increased so that the air-fuel ratio of the homogeneous air-fuel mixture generated in the entire cylinder by the fuel injected in the intake stroke is richer than the stoichiometric air-fuel ratio if the ignition timing is later than the predetermined timing. In this way, combustion stability and combustion speed can be ensured when the expansion stroke injection timing and the ignition timing are retarded.

It should be noted that although the injection-ignition interval Δt is an interval from the fuel injection end timing to the ignition timing in each of the above embodiments, there is no limitation to this. Since each embodiment is based on a technical concept to ignite before the stratified air-fuel mixture around the ignition plug 7 is dispersed, an interval from the fuel injection start timing to the ignition timing may be set as the injection-ignition interval Δt.

Although the embodiments of the present invention have been described above, the above embodiments are merely an illustration of some application examples of the present invention and not intended to limit the technical scope of the present invention to the specific configurations of the above embodiments.

The invention claimed is:

1. An internal combustion engine control device for controlling an in-cylinder direct injection type spark ignition internal combustion engine including a fuel injection valve for injecting fuel into a cylinder and an ignition plug for igniting an air-fuel mixture in the cylinder and configured to inject the fuel in an expansion stroke and ignite the injected fuel in the expansion stroke under a specific operating condition, wherein:
   an interval between a fuel injection timing and an ignition timing in the expansion stroke is shortened as the ignition timing is retarded;
   a fuel injection amount in the expansion stroke is increased as the ignition timing after the fuel injection in the expansion stroke is retarded.

2. An internal combustion engine control method for controlling an in-cylinder direct injection type spark ignition internal combustion engine including a fuel injection valve for injecting fuel into a cylinder and an ignition plug for igniting an air-fuel mixture in the cylinder and configured to inject the fuel in an expansion stoke and ignite the injected fuel in the expansion stroke under a specific operating condition, wherein:
   an interval between a fuel injection timing and an ignition timing in the expansion stroke is shortened as the ignition timing is retarded,
   a fuel injection amount in the expansion stroke is increased as the ignition timing after the fuel injection in the expansion stroke is retarded.

\* \* \* \* \*